United States Patent
Gajiwala

(10) Patent No.: US 7,767,746 B2
(45) Date of Patent: Aug. 3, 2010

(54) BASALT FIBER AND NANOCLAY COMPOSITIONS, ARTICLES INCORPORATING THE SAME, AND METHODS OF INSULATING A ROCKET MOTOR WITH THE SAME

(75) Inventor: Himansu M. Gajiwala, Layton, UT (US)

(73) Assignee: Alliant Techsystems Inc., Edina, MN (US)

( * ) Notice: Subject to any disclaimer, the term of this patent is extended or adjusted under 35 U.S.C. 154(b) by 1034 days.

(21) Appl. No.: 11/431,387

(22) Filed: May 9, 2006

(65) Prior Publication Data

US 2007/0261385 A1   Nov. 15, 2007

(51) Int. Cl.
C08K 3/34 (2006.01)
(52) U.S. Cl. .................. 524/442; 524/443; 524/444; 524/445
(58) Field of Classification Search .............. 524/442, 524/443, 444, 445
See application file for complete search history.

(56) References Cited

U.S. PATENT DOCUMENTS

| | | |
|---|---|---|
| 2,870,108 A | 1/1959 | Nickerson |
| 2,964,457 A | 12/1960 | Kraus |
| 3,347,047 A | 10/1967 | Hartz et al. |
| 3,421,970 A | 1/1969 | Daly et al. |
| 3,562,304 A | 2/1971 | Tucker |
| 3,637,576 A | 1/1972 | Sutherland |
| 3,686,868 A | 8/1972 | Chase et al. |
| 3,723,481 A | 3/1973 | Bobear |
| 3,908,061 A | 9/1975 | Byrne et al. |
| 3,928,282 A | 12/1975 | Lohr, Jr. et al. |
| 3,973,397 A | 8/1976 | Chase et al. |
| 4,066,590 A | 1/1978 | Eldred et al. |
| 4,072,796 A | 2/1978 | Reinhardt et al. |
| 4,297,145 A | 10/1981 | Wolff et al. |
| 4,369,297 A | 1/1983 | Bilow |
| 4,373,048 A | 2/1983 | Schubert et al. |
| 4,433,020 A | 2/1984 | Narukawa et al. |
| 4,492,779 A | 1/1985 | Junior et al. |
| 4,504,532 A | 3/1985 | Herring |
| 4,507,165 A | 3/1985 | Herring |
| 4,514,541 A | 4/1985 | Frances |
| 4,524,169 A | 6/1985 | Wolff et al. |
| 4,550,130 A | 10/1985 | Kishida et al. |
| 4,600,732 A | 7/1986 | Junior et al. |
| 4,640,861 A | 2/1987 | Binnersley et al. |
| 4,649,701 A | 3/1987 | Wendel |
| 4,663,065 A | 5/1987 | Herring |
| 4,666,763 A | 5/1987 | King et al. |
| 4,711,086 A | 12/1987 | Offe et al. |
| 4,785,047 A | 11/1988 | Jensen |
| 4,878,431 A | 11/1989 | Herring |
| 4,953,476 A | 9/1990 | Sayles |
| 4,956,397 A | 9/1990 | Rogowski et al. |
| 4,980,233 A | 12/1990 | McCullough, Jr. et al. |
| 4,997,716 A | 3/1991 | McCullough, Jr. et al. |
| 4,999,238 A | 3/1991 | Gawin |
| 5,007,343 A | 4/1991 | Marks |
| 5,019,450 A | 5/1991 | Cogswell et al. |
| 5,024,818 A | 6/1991 | Tibbetts et al. |
| 5,024,860 A | 6/1991 | Chang |
| 5,038,561 A | 8/1991 | Chase |
| 5,039,572 A | 8/1991 | Bobsein et al. |
| 5,212,944 A | 5/1993 | Martin et al. |
| 5,213,889 A | 5/1993 | Cogswell et al. |
| 5,216,057 A | 6/1993 | Pratt et al. |
| 5,225,457 A | 7/1993 | Borowczak et al. |
| 5,276,093 A | 1/1994 | Kitagawa et al. |
| 5,344,689 A | 9/1994 | Ide et al. |
| 5,352,312 A | 10/1994 | Guillot |
| 5,352,507 A | 10/1994 | Bresson et al. |
| 5,364,905 A | 11/1994 | Bauer et al. |
| 5,374,415 A | 12/1994 | Alig et al. |
| 5,391,627 A | 2/1995 | Araki et al. |
| 5,399,599 A | 3/1995 | Guillot |

(Continued)

FOREIGN PATENT DOCUMENTS

EP    0116453    8/1984

(Continued)

OTHER PUBLICATIONS

"Basalt fiber," Wikipedia, <<http://en.wikipedia.org/wiki/Basalt_fiber>> Nov. 25, 2005, 1 page.

(Continued)

*Primary Examiner*—Peter D Mulcahy
(74) *Attorney, Agent, or Firm*—TraskBritt

(57) ABSTRACT

An insulation composition that comprises at least one nitrile butadiene rubber, basalt fibers, and nanoclay is disclosed. Further disclosed is an insulation composition that comprises polybenzimidazole fibers, basalt fibers, and nanoclay. The basalt fibers may be present in the insulation compositions in a range of from approximately 1% by weight to approximately 6% by weight of the total weight of the insulation composition. The nanoclay may be present in the insulation compositions in a range of from approximately 5% by weight to approximately 10% by weight of the total weight of the insulation composition. Rocket motors including the insulation compositions and methods of insulating a rocket motor are also disclosed.

27 Claims, 1 Drawing Sheet

U.S. PATENT DOCUMENTS

| | | | |
|---|---|---|---|
| 5,409,775 | A | 4/1995 | Harada et al. |
| 5,437,920 | A | 8/1995 | Bauer et al. |
| 5,498,649 | A | 3/1996 | Guillot |
| 5,547,525 | A | 8/1996 | Bennett et al. |
| 5,565,535 | A | 10/1996 | Costin et al. |
| 5,569,716 | A | 10/1996 | Okamoto et al. |
| 5,594,060 | A | 1/1997 | Alig et al. |
| 5,621,045 | A | 4/1997 | Patel et al. |
| 5,629,371 | A | 5/1997 | Kitagawa et al. |
| 5,661,198 | A | 8/1997 | Inatani et al. |
| 5,721,301 | A | 2/1998 | Takigawa |
| 5,762,746 | A | 6/1998 | Hartwell et al. |
| 5,767,221 | A | 6/1998 | Poulter et al. |
| 5,780,538 | A | 7/1998 | Cohen et al. |
| 5,821,284 | A | 10/1998 | Graham et al. |
| 5,830,384 | A | 11/1998 | Stephens et al. |
| 5,840,227 | A | 11/1998 | Bourdoncle et al. |
| 5,891,561 | A | 4/1999 | Kinoshita et al. |
| 5,989,459 | A | 11/1999 | Nguyen et al. |
| 6,489,385 | B1 | 12/2002 | Fujii et al. |
| 6,554,936 | B1 | 4/2003 | Metcalf et al. |
| 6,606,852 | B1 | 8/2003 | Harvey et al. |
| 6,691,505 | B2 | 2/2004 | Harvey et al. |
| 6,812,276 | B2 * | 11/2004 | Yeager ............... 524/495 |
| 7,013,998 | B2 | 3/2006 | Ray et al. |
| 7,250,477 | B2 * | 7/2007 | Guo et al. ............. 525/391 |
| 2002/0018847 | A1 | 2/2002 | Guillot |
| 2002/0142147 | A1 | 10/2002 | Sogabe et al. |
| 2002/0189233 | A1 | 12/2002 | Harvey et al. |
| 2004/0122153 | A1 | 6/2004 | Guo et al. |
| 2004/0157979 | A1 | 8/2004 | Harvey et al. |
| 2004/0241479 | A1 | 12/2004 | Domine et al. |
| 2005/0059754 | A1 | 3/2005 | Lunt et al. |
| 2005/0101737 | A1 | 5/2005 | Pazur et al. |
| 2005/0142349 | A1 | 6/2005 | Irwin et al. |
| 2005/0202258 | A1 | 9/2005 | Swales et al. |
| 2005/0211930 | A1 | 9/2005 | DeMeo et al. |
| 2005/0266757 | A1 | 12/2005 | Roekens et al. |

FOREIGN PATENT DOCUMENTS

| | | |
|---|---|---|
| EP | 0 172 957 A1 | 3/1986 |
| EP | 0 172 957 B1 | 3/1986 |
| EP | 0 446 573 A2 | 9/1991 |
| FR | 2554114 | 5/1985 |
| GB | 1301296 | 12/1972 |
| JP | 8-127674 | 5/1996 |
| WO | WO 91/19754 | 12/1972 |
| WO | WO 01/04198 | 7/2000 |
| WO | WO 01/20966 A2 | 3/2001 |
| WO | WO 01/46279 A1 | 6/2001 |
| WO | WO 02/079307 A2 | 10/2002 |

OTHER PUBLICATIONS

"Buss Kneader MKS Modular Series" Flexible systems featuring high process reliability for cost-effective compounding solutions, brochure, Buss (America), Inc., Bloomingdale, Illinois.

Buss Kneader Operating Principle, http:/www.busscompounding.com/Seiten/English/Buss%20Kneader/kneader1.htm, Dec. 3, 1999.

Chang, Karl K., Aramid Fibers, ASM International Handbook, vol. 21, p. 41.

Darmstadt, H., 1997, Elsevier Science Ltd., Effects of Surface Treatment on the Bulk Chemistry and Structure of Vapor Grown Carbon Fibers, p. 1581, 5 pages.

DuPont Dow Elastomers, "Nordel IP Product Specification Information," pp. 2-3.

DuPont Dow Elastomers, Introducing Nordel IP, Setting a New Standard in Predictability, "Delivering a New Standard of Performance," (1997), pp. 1-6.

DuPont Dow Elastomers, Nordel IP NDR 4640, "Nordel IP Grade Comparison," (1997), pp. 1-7.

DuPont Dow Elastomers, Nordel IP NDR-4520, "Nordel IP Grade Comparison," (1997), pp. 1-5.

Hill, Jeanene Renee, "Usage of Vapor Grown Carbon Fiber Composit with Phenolic Matrix in the Space Shuttle Usable Solid Rocket Motor Nozzle," Online!: May 13, 1999, Mississippi State University, Retrieved from the Internet: < URL:http://www.me.msstate.edu/STUDENT/ThesisHi11.htm> Retrieved on Mar. 14, 2003.

Ibarra et al., "The Effect of Oxidized Carbon Fibre Content on the Properties of Thermal Plastic Elastomer Composites," Kautschuk and Gummi—Kunststoffe, Dr. Alfred Huthig Verlag Gmbh; Heidelberg, DE; vol. 50, No. 6, Jun. 1, 1997, pp. 478-480, 482, 484.

Libera, Joseph, et al., 2001, Pergamon, Hydrothermal synthesis of graphite tubes using Ni catalyst, pp. 1308 & 1317, 12 pages.

Patton et al., "Vapor Grown Carbon Fiber Composites with Epoxy and Poly(Phenylene Sulfide) Matrices," Composites Part A: Applied Science and Manufacturing; Elsevier Science Publishers B.V.; Amsterdam, NL; vol. 30, No. 9; Sep. 1999; pp. 1081-1091.

Pennwalt, "Dialkyl Peroxides".

Product Description, Grades of Nordel IP Based on Insite Catalysts and Process Technology (1997), p. 3.

Product literature on Saret 633 and Saret 634 Metallic Coagents.

Product literature on TULCO-Treated Silica Products (Jun. 1999), p. 2.

Product literature, "Treated Fumed Silicas Product Guide," for Cabot Products CAB-O-SIL Treated Fumed Silica (Jun. 1999).

Sutton, G.P., "Rocket Propulsion Element," 1992, Wiley & Sons, New York, US, pp. 106-109.

Tarasen, William, et al., Pyrograf III VGSF Nanofibers for Engineered Composites.

* cited by examiner

US 7,767,746 B2

BASALT FIBER AND NANOCLAY COMPOSITIONS, ARTICLES INCORPORATING THE SAME, AND METHODS OF INSULATING A ROCKET MOTOR WITH THE SAME

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. NAS8-97238 awarded by the National Aeronautics and Space Administration ("NASA").

FIELD OF THE INVENTION

The present invention relates to thermal insulation for use in an article or apparatus, such as a rocket motor. More specifically, the present invention relates to thermal insulation that includes a nitrile butadiene rubber, basalt fibers, and nanoclay, as well as insulation that includes polybenzimidazole fibers, basalt fibers, and nanoclay.

BACKGROUND OF THE INVENTION

Combustion of a propellant in a rocket motor creates a hostile environment that is characterized by extremely high temperatures, pressures, and turbulence. Combustion temperatures within the rocket motor typically exceed 5000° F. (2760° C.) and pressures frequently exceed 1500 pounds per square inch ("psi") (10.3 MPascal). In addition, velocities of gases produced during the combustion reach or exceed Mach 0.2 near the throat of the rocket motor. To protect the rocket motor as the propellant is combusted, heat-sensitive components of the rocket motor are insulated. Without insulation, the combustion gases would erode and burn through the heat sensitive components, causing the rocket motor to fail.

The rocket motor is typically insulated with a material that provides resistance to high temperatures, pressures, and erosive flow conditions. Various insulative materials have been used, such as phenolic resins, epoxy resins, high temperature melamine-formaldehyde coatings, ceramics, or polyester resins. However, these materials, when cured, become rigid and are essentially unworkable, which makes construction of the rocket motor and processing of these materials difficult. In addition, structures formed from these materials crack or blister when exposed to the rapid temperature and pressure changes that occur as the propellant is burned.

Other insulative materials include an elastomeric polymer that is reinforced with asbestos, polybenzimidazole fibers, or polyaramid fibers. These insulative materials are "ablative" in that they are partially consumed during combustion of the propellant. While the insulative material gradually erodes, the insulative material remains in the rocket motor for a sufficient amount of time to protect the rocket motor while the propellant completely combusts. In other words, the insulative material erodes at a sufficiently slow rate that adequate protection is provided during the operation of the rocket motor.

One insulative material that has been widely used in rocket motors includes asbestos and a nitrile butadiene rubber ("NBR"). For instance, an asbestos-filled nitrile butadiene rubber ("ASNBR") composition has been used in the Reusable Solid Rocket Motor ("RSRM") space shuttle program. When used as an insulative material, the ASNBR composition provides excellent ablative characteristics and good rheological, mechanical, and electrostatic properties. However, due to environmental and health concerns with using asbestos and the closure of asbestos mines in Canada, an asbestos-free replacement for ASNBR is actively being sought. To date, the most suitable replacements for the ASNBR composition include a 7% KEVLAR®-filled ethylene propylene diene monomer ("EPDM") material, an 11% KEVLAR®-filled EPDM material, and a carbon-filled EPDM material, all of which are produced by Alliant Techsystems Inc. (Edina, Minn.).

Additional EPDM compositions have been used to insulate rocket motors. United States Patent Application Publication 2002/0018847 to Guillot and U.S. Pat. No. 6,691,505 to Harvey et al. disclose, inter alia, a rocket motor insulation that includes carbon fibers dispersed in an EPDM matrix. The insulation also includes polybenzoxazole fibers ("PBO"), polybenzimidazole fibers, aramid fibers, iron oxide, milled glass, talc, silica, or ceramic clay.

United States Patent Application Publication 2002/0142147 to Sogabe et al. discloses a transmission belt that includes a rubber belt body and a cord, which are integrated by vulcanizing the rubber of the belt body. The belt body is formed from chloroprene rubber or a hydrogenated nitrile rubber and the cord is formed from fibers of poly-p-phenylene-benzobisoxazole. Poly-p-phenylene-benzobisoxazole is also known as poly-p-phenylene-2,6-benzobisoxazole or polybenzoxazole. Therefore, as used herein "PBO" refers to poly-p-phenylene-benzobisoxazole, poly-p-phenylene-2,6-benzobisoxazole, or polybenzoxazole. U.S. Pat. No. 5,891,561 to Kinoshita et al. also discloses a transmission belt having a fiber cord formed from aramid fibers or PBO fibers. The fiber cord is embedded in rubber, such as a hydrogenated nitrile rubber, a nitrile butadiene rubber, chlorophene rubber, chlorosulfonated polyethylene rubber, or alkylated chlorosulfonated polyethylene rubber.

BRIEF SUMMARY OF THE INVENTION

The present invention, in several embodiments, relates to an insulation composition that comprises at least one nitrile butadiene rubber ("NBR"), basalt fibers, and a nanoclay. In one embodiment, the acrylonitrile content of the NBR ranges from approximately 26% by weight ("wt %") to approximately 35 wt %. In a further embodiment, the acrylonitrile content of the NBR ranges from approximately 30 wt % to approximately 35 wt %. The NBR may be a copolymer of acrylonitrile and butadiene. The NBR may be present in the insulation composition in a range from approximately 35 wt % to approximately 56 wt % of a total weight of the insulation composition. The basalt fibers may be present in a range of from approximately 1 wt % to approximately 6 wt % of the total weight of the insulation composition. Nanoclay may be present in a range of from approximately 5 wt % to approximately 10 wt % of the total weight of the insulation composition. The insulation composition may further comprise one or more additives, such as at least one reinforcing agent, at least one tackifier, at least one antioxidant, at least one flame retardant, at least one filler, at least one plasticizer, at least one processing aid, carbon black, at least one pigment, at least one bonding agent, at least one cure agent, at least one cure accelerator, at least one cure activator, or combinations thereof. The insulation composition may also further comprise one or more of cellulose fibers, sisal fibers, mineral wool fibers, nylon fibers, polyester fibers, polyimide fibers, polybenzimidazole fibers, polyaramid fibers, or combinations thereof.

The present invention also relates to an insulation composition that comprises polybenzimidazole ("PBI") fibers, basalt fibers, and at least one nanoclay. In one embodiment, the PBI fibers may be of a specific length, such as approximately ¼ of an inch. The PBI fibers may be present in the insulation composition at a range from approximately 2 wt % to approximately 8 wt % of a total weight of the insulation composition. The basalt fibers may be present at a range of from approximately 1 wt % to approximately 6 wt % of the total weight of the insulation composition. Nanoclay may be present at a range of from approximately 5 wt % to approximately 10 wt % of the total weight of the insulation composition. The insulation composition may further comprise one or more additives, such as at least one reinforcing agent, at least one tackifier, at least one antioxidant, at least one flame retardant, at least one filler, at least one plasticizer, at least one processing aid, at least one retarder, carbon black, at least one pigment, at least one bonding agent, at least one cure agent, at least one cure accelerator, at least one cure activator, or combinations thereof. The insulation composition may further comprise a matrix agent such as a rubber or a polymer, for example, but not limited to, NBR. The insulation composition may also further comprise one or more of cellulose fibers, sisal fibers, mineral wool fibers, nylon fibers, polyester fibers, polyimide fibers, polyaramid fibers, or combinations thereof.

The present invention, in a currently preferred embodiment, comprises PBI fibers, NBR, basalt fibers, and nanoclay. In such a currently preferred embodiment, the NBR is present at 49.84 wt %, the PBI fibers are ¼ inch long and present at 5.89 wt %, basalt fibers are present at 3.62 wt %, and the nanoclay is CLOISITE® 10A and is present at 7.7 wt %. The currently preferred embodiment further comprises a reinforcing agent in the form of HI-SIL® 233 present at 8.52 wt %, a flame retardant in the form of FIREBRAKE® ZB present at 3.62 wt %, an antioxidant in the form of AGERITE® Stalite S present at 1.09 wt %, a tackifier in the form of SP25 present at 6.34 wt %, a cure agent in the form of SCSD-70 present at 1.81 wt %, a plasticizer in the form of DOP-DLC-A present at 7.25 wt %, a filler in the form of carbon black present at 0.63 wt %, a cure accelerator in the form of ALTAX® present at 0.36 wt %, a cure activator in the form of zinc oxide present at 2.08 wt %, a cure activator in the form of stearic acid present at 1.00 wt %, and a retarder in the form of Retarder SAFE present at 0.23 wt %.

The present invention, in another embodiment, also relates to a rocket motor that comprises a case, an insulation applied to an inner surface of the case, and a solid propellant disposed in the case. The insulation may be an insulation comprising at least one NBR, basalt fibers, and at least one nanoclay. The at least one NBR, basalt fibers, and nanoclay may be present in the insulation in the amounts described above. The insulation may further comprise the additives and fibers described above. The insulation may further be an insulation comprising PBI fibers, basalt fibers, and at least one nanoclay. The PBI fibers, basalt fibers, and nanoclay may be present in the insulation in the amounts described above. The insulation may further comprise one or more of the matrix agents, additives, and fibers described above.

The present invention, in a further embodiment, also relates to a method of insulating a rocket motor. The method comprises applying an insulation that may comprise at least one NBR, basalt fibers, and a nanoclay to an inner surface of a rocket motor case and curing the insulation. The at least one NBR, basalt fibers, and nanoclay may be present in the insulation in the amounts described above. The insulation may further comprise the additives and fibers described above. The insulation may further be an insulation that comprises PBI fibers, basalt fibers, and a nanoclay. The PBI fibers, basalt fibers, and nanoclay may be present in the insulation in the amounts described above. The insulation may further comprise one or more of the matrix agents, additives, and fibers described above.

BRIEF DESCRIPTION OF THE SEVERAL VIEWS OF THE DRAWINGS

While the specification concludes with claims particularly pointing out and distinctly claiming that which is regarded as the present invention, the advantages of this invention may be more readily ascertained from the following description of the invention when read in conjunction with the accompany drawing in which:

DETAILED DESCRIPTION OF THE INVENTION

Figure 1B:
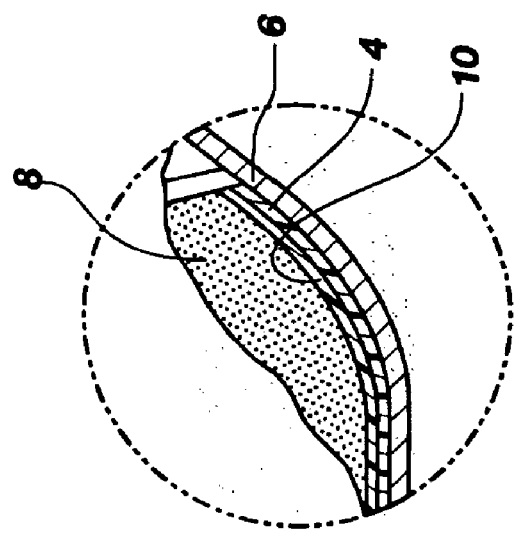
FIG. 1A is a cross-sectional view of a rocket motor that includes the insulation composition of the present invention and FIG. 1B is an enlarged view of a portion of the rocket motor encircled in FIG. 1A.

An insulation composition that includes at least one NBR, basalt fibers, and at least one nanoclay is disclosed. Further disclosed is an insulation composition that includes PBI fibers, basalt fibers, and at least one nanoclay. The insulation compositions may be used as insulation to protect a rocket motor during combustion of a propellant, or in association with another article or assembly that would benefit from protection from heat and gases. The insulation composition may have rheological, physical, mechanical, electrostatic, and ablative properties that are improved or at least comparable to the properties of a conventional ASNBR composition. For instance, the insulation composition may have better rheological and mechanical properties than the ASNBR composition and physical, electrostatic, and ablative properties that are similar to those of the ASNBR composition. Since the insulation composition of the present invention is free of asbestos, environmental and health risks associated with the insulation composition may be substantially reduced or eliminated.

NBR used in insulation compositions according to the present invention may be a nitrile rubber having an acrylonitrile content that ranges from approximately 26 wt % to approximately 35 wt %, such as from approximately 30 wt % to approximately 35 wt %. The acrylonitrile content refers to the percentage of bound acrylonitrile in the NBR. Mixtures of NBRs, each having an acrylonitrile content within the above-mentioned range, may also be used. The NBR may be unhydrogenated or hydrogenated. Examples of NBRs that may be used in the insulation composition include, but are not limited to, those sold under the NIPOL® tradename, such as NIPOL® 1042, NIPOL® 1052, NIPOL® 1052-30, NIPOL® 1312, or mixtures thereof. The NIPOL® products are copolymers of acrylonitrile and butadiene and are commercially available from Zeon Chemicals (Louisville, Ky.). NIPOL® 1042 has an acrylonitrile content that ranges from approximately 32 wt % to approximately 34 wt %, a Mooney viscosity at 100° C. that ranges from approximately 75 to approximately 90, and a specific gravity of 0.98. NIPOL® 1052 has an acrylonitrile content that ranges from approximately 32 wt % to approximately 34 wt %, a Mooney viscosity at 100° C. that ranges from approximately 45 to approximately 60, and a specific gravity of 0.98. NIPOL® 1052-30 is a lower Mooney viscosity version of NIPOL® 1052 and has an acrylonitrile content that ranges from approximately 32 wt % to approximately 34 wt %, a Mooney viscosity at 100° C. that ranges from approximately 25 to approximately 40, and a specific gravity of 0.98. NIPOL® 1312 is a liquid NBR and has an acrylonitrile content that ranges from approximately 27 wt % to approximately 30 wt %, a Brookfield viscosity at 50° C. that ranges from approximately 20,000 centipoise ("cps") to approximately 30,000 cps, and a specific gravity of 0.96. NBRs that may be used in the insulation composition are available under other trade names including, but not limited to, the KRYNAC®, Baymond, Paracil, or PERBUNAN® tradenames.

The PBI fibers used in insulation compositions of the present invention are known in the art. As previously mentioned, PBI is known in the art as polybenzimidazole. PBI fibers may have a length that ranges from approximately 1/16 to approximately 1 inch. In one embodiment, 1/4 inch fibers are used. PBI fibers are commercially available from PBI performance Products Inc.

Basalt fiber is a material made from extremely fine fibers of basalt. Basalt fibers may vary in diameter from approximately 5 μm to approximately 25 μm. Preferably, the fibers used in the present invention are greater than 5 μm in diameter as this is far enough above the respiratory limit to make basalt fiber a suitable replacement for asbestos. Basalt fibers are available from commercial sources such as Fiberand Corp., Albarrie Canada Ltd., and under the brand name BASALTEX® from the Masureel Group.

Nanoclays are typically clays from the smectite family. Smectites have a unique morphology, featuring one dimension in the nanometer range. Smectite refers to a family of non-metallic clays primarily composed of hydrated sodium calcium aluminum silicate. Common names for smectite include montmorillonite or sodium montmorillonite ("sodium Bentonite" or "Wyoming bentonite") and swelling bentonite ("Western bentonite"). Nanoclays are available from commercial sources such as Southern Clay Products Inc., Reade Advanced Materials, or Nanocor.

The amount of the basalt fibers, nanoclay and/or NBR, PBI fibers, and optional ingredients in the insulation composition may be adjusted to achieve desired rheological, physical, mechanical, electrostatic, and ablative properties, such as a desired viscosity, density, scorch resistance, cure time, Shore A hardness, tensile elongation (parallel to fibers and perpendicular to fibers), tensile strength (parallel to fibers and perpendicular to fibers), surface resistivity, volume resistivity, dielectric constant, or relaxation time. Further, the length or diameter of the basalt fibers and PBI fibers may be adjusted to achieve desired properties as enumerated supra.

The basalt fibers may be present in the insulation composition in a range of from approximately 1 wt % of a total weight of the insulation composition to approximately 6 wt % of the total weight of the insulation composition. Nanoclay may be present in the insulation composition in a range of from approximately 5 wt % of a total weight of the insulation composition to approximately 10 wt % of the total weight of the insulation composition.

The NBR may be present in the insulation composition in a range of from approximately 45 wt % of a total weight of the insulation composition to approximately 56 wt % of the total weight of the insulation composition. The PBI fibers may be present in the insulation composition in a range of from approximately 2 wt % of the total weight of the insulation composition to approximately 8 wt % of the total weight of the insulation composition. PBI fibers may have a length that ranges from approximately 1/16 of an inch to approximately 1 inch. It is currently preferred that 1/4 inch PBI fibers are used.

The insulation composition may include at least one matrix agent. Suitable matrix agents include, but are not limited to, one or more organic elastomeric polymers. As referred to herein, the term "organic elastomeric polymer" means a polymer having a backbone including carbon as a main component and free of metals or metalloids in the backbone. Generally, an elastomeric polymer is stretchable and compressible under moderate tension with a relatively high tensile strength and memory so that, upon release of the tension or compression, the elastomer retracts towards its original dimensions. Organic elastomers suitable for the present invention include ethylene propylene-diene monomer (EPDM) rubbers, natural rubber, butadiene-styrene copolymer rubbers, nitrile rubbers (such as NBR), polybutadiene rubbers, polyisoprene rubbers, and the like.

Various mixtures, combinations, copolymers, and blends of these exemplary rubbers are also included within the scope of the invention.

Suitable solid EPDM terpolymers having a 1,4-hexadiene component for use in this invention include NORDEL® 1040, NORDEL® 2522, and NORDEL® 2722E, made by DuPont Dow Elastomers of Wilmington, Del. Suitable solid EPDM terpolymers having an ENB diene component for use in this invention include, without limitation, and as stated above, KELTAN® 4506, KELTAN® 1446A, KELTAN® 2308, each of which is available from DSM Elastomers of the Netherlands, and NORDEL® IP 4520 and NORDEL® IP 4640, both of which are and continue to be available from DuPont Dow Elastomers.

Small amounts of conventional fibers may optionally be present in the insulation composition. These fibers may include, but are not limited to, cellulose fibers, sisal fibers, mineral wool fibers, nylon fibers, polyester fibers, polyimide fibers, polybenzimidazole fibers, polyaramid fibers, or mixtures thereof.

The insulation composition may optionally include at least one additive from at least one of the following categories: a reinforcing agent, a tackifier, an antioxidant, a flame retardant, a filler, a plasticizer, a processing aid, carbon black, a pigment, or a bonding agent to achieve the desired properties in the insulation composition. A specific ingredient used in the insulation composition may provide one or more functions. One example of a reinforcing agent includes, but is not limited to, HI-SIL® 233. One example of a tackifying agent includes, but is not limited to, PICCO® 6100, which is an aromatic hydrocarbon resin available from Eastman Chemical Co. (Kingsport, Tenn.). Another example of a tackifying agent includes, but is not limited to, AKROCHEM® P-87, which is a phenolic resin that is available from Akrochem Chemical Corp. (Akron, Ohio). An antioxidant that may be used in the insulation composition includes, but is not limited to, AGERITE® Stalite S, which is available from R.T. Vanderbilt Chemical Company (Norwalk, Conn.). Organic or inorganic flame retardants that may be used include, but are not limited to, HI-SIL® 233 (amorphous, precipitated silica), FIREBRAKE® ZB (zinc borate), PHOS-CHEK® P-30 (ammonium polyphosphate), VERTEX® 60 (magnesium hydroxide), MELAPUR® (a melamine derivative), talc, clay, or mixtures thereof. HI-SIL® 233 is available from PPG Industries, Inc. (Pittsburgh, Pa.), PHOS-CHEK® P-30 is available from Monsanto (St. Louis, Mo.), FIREBRAKE® ZB is available from US Borax Co. (Los Angeles, Calif.), VERTEX® 60 is available from J.M. Huber Corp. (Edison, N.J.), and MELAPUR® is available from Ciba Specialty Chemicals Holding, Inc. (Basel, Switzerland). Mixtures of organic and inorganic flame retardants may also be used in the insulation composition.

Examples of fillers that may be used include, but are not limited to, silica, VERTEX® 60, OXYVINYLS® 500F (polyvinyl chloride), which is available from OxyVinyls, LP (Dallas, Tex.), MISTRON VAPOR® (talc), which is available from Cyprus Mines Corp. (Englewood, Colo.), Polyplate HMT (delaminated kaolin clay), which is available from J.M. Huber Corp. (Edison, N.J.), or carbon black. An example of a plasticizer for NBR includes, but is not limited to, dioctyl phthalate, which may be absorbed on silica. As used herein, the term "DOP-DLC-A" refers to dioctyl phthalate absorbed on silica. One example of a processing aid includes, but is not limited to, stearic acid. In addition to the materials described above, materials that provide similar functions or properties to the insulation composition and that are sold under different tradenames may also be used.

The insulation composition may also include a cure package, which includes a cure agent and, optionally, a cure accelerator, a cure activator, a retarder, or combinations thereof. The cure agent may be a sulfur cure agent, a peroxide cure agent, or a bromomethyl alkylated phenolic resin. Examples of sulfur cure agents include, but are not limited to, CRYSTEX® OT-20 (an oil-treated polymeric sulfur), which is available from Flexsys America LP (Akron, Ohio), AKROSPERSE® IS-70 (a 70% sulfur dispersion), which is available from Akrochem Chemical Corp. (Akron, Ohio), or other forms of elemental sulfur. Sulfur may also be dispersed in a rubber at approximately 70% concentration, such as a SCSD-70 polydispersion, which is a dispersion of 70% insoluble or polymeric sulfur (CRYSTEX®) in 30% of a SBR elastomeric binder. Examples of peroxide cure agents include, but are not limited to, dicumyl peroxide, 2,5-dimethyl-2,5-bis-(t-butylperoxy)hexane, 2,5-dimethyl-2,5-bis-(benzoyl-peroxy)hexane, 2,5-dimethyl-2,5-di(t-butylperoxy)-3-hexane, n-butyl-4,4-bis-(t-butylperoxyl)valerate, 4,4'-methyl-bis-(cyclohexyl-amine)carbomate, 1,1-bis-(t-butylperoxy)-3,3,5-trimethylcyclohexane, α,α'-bis-(t-butylperoxy)-diisopropylbenzene, 2,5-dimethyl-2,5-bis-(t-butylperoxy)hexyne-3, t-butyl perbenzoate, or mixtures thereof. The cure agent may be present in the insulation composition from approximately 0.5 parts per hundred ("phr") to approximately 8 phr, such as from approximately 1.5 phr to approximately 5 phr. As used herein, the term "phr" refers to parts by weight per one hundred parts by weight of the NBR.

The cure accelerator may be a phosphate cure accelerator, a butyl zimate material, a tetramethylthiuram monosulfide material, or a benzothiazyl disulfide material. Tetramethylthiuram monosulfide is available as AKROCHEM® TMTM from Akrochem Chemical Corp. (Akron, Ohio). Tetramethylthiuram monosulfide is also available under the Thionex tradename. Benzothiazyl disulfide is sold under the ALTAX® tradename and is available from R.T. Vanderbilt Co., Inc. (Norwalk, Conn.). The cure activator may be stearic acid or a metal oxide, such as zinc oxide or magnesium oxide. Zinc oxide is available under the KADOX® tradename from Zinc Corp. of America (Monaca, Pa.), such as KADOX® 920C. In one embodiment, the cure accelerator is ALTAX®, AKROCHEM® TMTM, or mixtures thereof and the cure activator is stearic acid, zinc oxide, or combinations thereof. A retarder may be any agent used to reduce the scorching of rubber compounds at processing. In one embodiment, the retarder is Retarder SAFE and is available from Akrochem Corp. (Akron, Ohio).

The insulation composition may be prepared by mixing the basalt fibers, nanoclay with NBR and/or PBI fibers, and any optional ingredients that may be present to form a master batch. During mixing, the master batch may reach a maximum temperature that ranges from approximately 290° F. to approximately 310° F. The master batch may be mixed until the basalt fibers, nanoclay, and any optional ingredients are substantially evenly distributed in the matrix agent. For instance, the master batch may be mixed for an optimum amount of time to prevent damage to the basalt fibers or to the conventional fibers (if present). The temperature of the master batch may be lowered before adding the cure package to prevent premature curing of the insulation composition. For instance, during the curative mixing, the master batch may be exposed to a maximum temperature that ranges from approximately 200° F. to approximately 220° F. before adding the cure package. The master batch and the cure package may be mixed until the insulation composition has a desired, rubber-like consistency. The insulation composition may be prepared in conventional rubber mixing equipment, such as in an internal mixer, a sigma blade mixer, a vertical blade mixer, or a compounding extruder mixer. Rubber mixing equipment is known in the art and, therefore, is not described in detail herein.

Figure 1A:
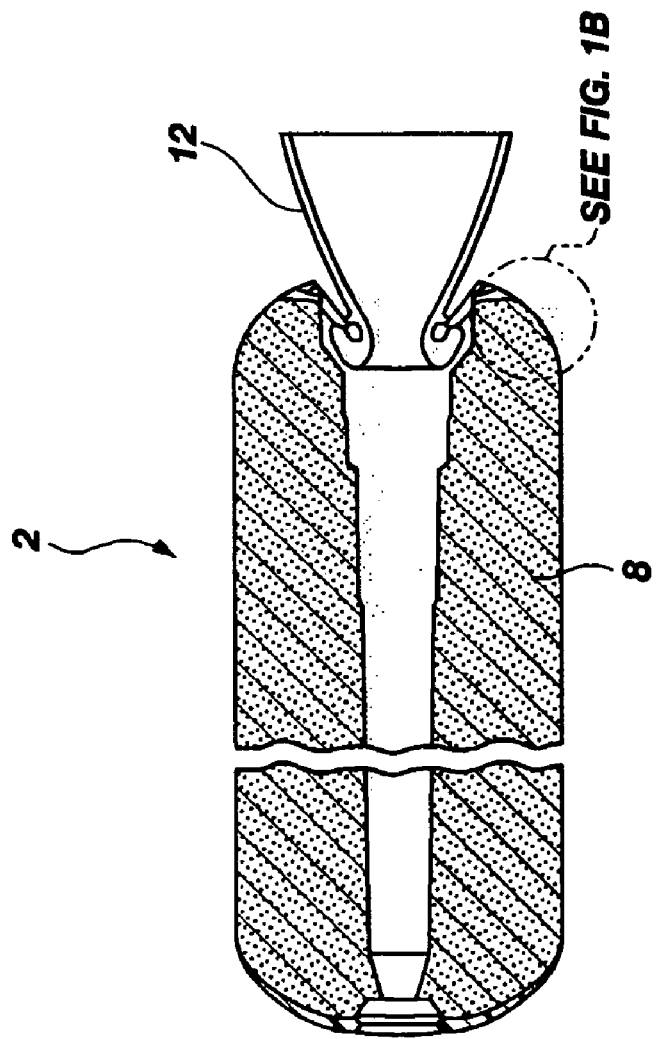

The insulation composition may be calendered or formed into a thin sheet, as known in the art, for use as insulation in a rocket motor. An embodiment of a rocket motor 2 that utilizes the insulation composition of the present invention as insulation 4 is shown in FIGS. 1A and 1B. FIG. 1B is an enlargement of the indicated portion of the rocket motor 2. The insulation 4 may be applied to an interior surface of a case 6 of the rocket motor 2 by conventional techniques, such as by bonding the insulation 4 to the case 6. The case 6 may be formed from a rigid material, such as a metal, a composite material, or a combination of a metal and a composite material. The rocket motor 2 may also include a solid propellant 8, which is illustrated in FIGS. 1A and 1B as a center perforation propellant. However, the invention is not limited to such. The solid propellant 8 may be an end-burning propellant or have any other propellant configuration known in the art. The solid propellant 8 may be disposed in the case 6. The solid propellant 8 may be a conventional propellant that is formulated to combust and produce thrust for attaining rocket motor propulsion. A liner 10 may, optionally, be interposed between the insulation 4 and the solid propellant 8. Compositions for the liner 10 and methods of applying the liner 10 to the rocket motor 2 are known in the art and, therefore, are not discussed in detail herein. The insulation 4 and the liner 10, if present, protect the case 6 of the rocket motor 2 from the extreme temperature and pressure conditions produced when the solid propellant 8 is combusted.

The insulation 4 may be applied to the inner surface of the case 6 of the rocket motor 2 in an uncured form and then cured. For instance, a sheet of the insulation 4 may be laid up or cast into the rocket motor 2 and cured. An adhesive layer (not shown) may, optionally, be used to bond the insulation 4 to the inner surface of the case 6 of the rocket motor 2. Adhesive layers are known in the art and, therefore, compositions of adhesive layers and application of the adhesive layer is not discussed in detail herein. However, for the sake of example only, CHEMLOK® adhesives may be used to bond the insulation 4 to the inner surface of the case 6 of the rocket motor 2. The insulation 4 may also be applied in an uncured form to a mandrel, cured, and subsequent layers of the rocket motor 2 formed over the insulation 4. Alternatively, the insulation 4 may be cured, cut into appropriate sizes or geometries, and applied to the inner surface of the rocket motor 2 using an adhesive layer. For the sake of example only, the insulation 4 may be cured for from approximately 60 minutes to approximately 120 minutes at a temperature that ranges from approximately 290° F. to approximately 300° F. and at a pressure of between approximately 50 psi and approximately 200 psi. However, additional temperatures, pressures, or amounts of time may be used to cure the insulation 4. For instance, lower or higher temperatures may be used if the cure time is adjusted accordingly. The cured insulation 4 may form a reduced bond line with the surface of the rocket motor 2.

Upon combustion of the solid propellant 8, combustion products of the solid propellant 8 may be directed into nozzle 12 and expelled, producing thrust to propel the rocket motor 2. A char may form on the insulation 4 as flames produced by the combusting solid propellant 8 contact the insulation 4. While the insulation 4 is ablative and is ultimately consumed during combustion of the solid propellant 8, the char may remain on the insulation 4 for an amount of time sufficient to protect the rocket motor 2. The char is a good insulator and may protect the insulation 4 from ablating at an undesirably fast rate by remaining attached to the insulation 4 for a longer period of time. As such, the rocket motor 2 may be protected from the extreme temperature and pressure conditions produced by combustion of the solid propellant 8.

The insulation compositions of the present invention may be formulated as a drop-in replacement for a conventional ASNBR composition. Therefore, the insulation compositions may be used in existing rocket motors without needing to significantly adjust the processing and loading techniques currently used to prepare and load the ASNBR composition.

In addition to being used as insulation in a rocket motor, the insulation compositions of the present invention may be used in other articles where protection from heat and gases is desired. For example, the insulation compositions may be used for heat and gas protection in under-the-hood applications in automobiles. The insulation compositions may also be used in conveyor belts, noise damping applications in automobile and other fields, or in other routine rubber applications, such as hoses, gaskets, seals, isolators and mounts, cushions, air emission hoses, or dock fenders.

The following examples serve to explain certain non-limiting embodiments of the insulation compositions of the present invention in more detail. These examples are not to be construed as being exhaustive or exclusive as to the scope of the invention.

EXAMPLES

Example 1

Formulations of Insulation Compositions

Insulation compositions having the ingredients shown in Table 1 were formulated by mixing all of the ingredients, except for the cure package, to form a master batch. During mixing, the temperature of the master batch was maintained at less than or equal to approximately 310° F. The ingredients of the master batch were mixed for up to approximately 25 minutes. The temperature of the master batch was reduced to less than or equal to approximately 220° F. before adding the ingredients of the cure package, which were mixed in with the master batch for up to approximately 5 minutes. The resulting insulation compositions had a rubber-like consistency.

TABLE 1

Insulation Compositions having an NBR(s) and PBI Fibers and/or Nanoclay.

| Ingredient | RDL6098 (wt %) | RDL6099 (wt %) | RDL7000 (wt %) | RDL7023 (wt %) | RDL7068 (wt %) | RDL7069 (wt %) | RDL7083 (wt %) | RDL7094 (wt %) |
|---|---|---|---|---|---|---|---|---|
| NIPOL ® 1052 | 26 | 26 | 26 | 23.38 | 22.85 | 18.12 | 18.24 | 18.24 |
| NIPOL ® 1042 | 26 | 26 | 26 | 23.38 | 22.85 | 27.19 | 27.36 | 24.62 |
| NIPOL ® 1312 | — | — | — | 4.97 | 4.57 | 4.53 | 4.56 | 7.3 |
| Stearic acid | 1.01 | 1.01 | 1.01 | 1.00 | 1.01 | 1.00 | 1.00 | 1.00 |
| PICCO ® 6100 | 3.89 | 3.89 | 3.89 | 3.87 | — | — | — | — |
| SP25 | — | — | — | — | 6.4 | 6.34 | 6.38 | 6.38 |
| AGERITE ® Stalite S | 1.05 | 1.05 | 1.05 | 1.04 | 1.10 | 1.09 | 1.09 | 1.09 |
| HI-SIL ® 233 | 8.83 | 8.83 | 8.83 | 8.78 | 8.59 | 8.52 | 8.57 | 8.57 |
| Polyplate HMT | — | — | — | — | 7.77 | — | — | — |
| CLOISITE ® 10A Nanoclay | 8.00 | 8.00 | 8.00 | 7.96 | — | 7.70 | 7.75 | 7.75 |
| Basalt Fibers | 3.78 | — | — | 3.76 | 3.66 | 3.62 | 3.65 | 3.65 |
| FIREBRAKE ® ZB | 3.7 | 3.7 | 3.7 | 3.68 | 3.66 | 3.62 | 3.65 | 3.65 |
| PBI Fibers (¼" long) | 6.00 | 6.00 | 3.78 | 5.97 | 5.94 | 5.89 | 5.93 | 5.93 |
| DOP-DLC-A | 8.00 | 8.00 | 8.00 | 7.96 | 7.31 | 7.25 | 7.30 | 7.30 |
| NAUGEX ® MBTS | — | — | — | — | — | — | 0.36 | 0.36 |
| Carbon black | — | — | — | — | — | 0.63 | — | — |
| Zinc oxide | 2.12 | 2.12 | 2.12 | 2.11 | 2.10 | 2.08 | 2.10 | 2.10 |
| ALTAX ® | 0.38 | 0.38 | 0.38 | 0.38 | 0.37 | 0.36 | — | — |
| CRYSTEX ® Sulfur | 1.24 | 1.24 | 1.24 | — | — | — | — | — |
| SCSD-70 Polydispersion | — | — | — | 1.76 | 1.83 | 1.81 | 1.82 | 1.82 |
| P-84[1] | — | 3.78 | 6.00 | — | — | — | — | — |
| Retarder SAFE | — | — | — | — | — | 0.23 | 0.23 | 0.23 |

[1]Polyimide fibers available from Lenzing AG (Lenzing, Austria)

Example 2

Rheological Properties of the Insulation Compositions

The rheological properties of the insulation compositions described in Example 1 were determined by conventional techniques. The results of the rheological testing are shown in Table 2. For comparative purposes, the rheological properties of an ASNBR composition are also provided. The ASNBR composition is produced by Esterline-Kirkhill Elastomers.

TABLE 2

Rheological Properties of ASNBR, RDL6098, RDL6099, RDL7000, RDL7023, RDL7069, RDL7083, and RDL7094.

| Property | ASNBR | RDL6098 | RDL6099 | RDL7000 | RDL7023 | RDL7069 | RDL7083 | RDL7094 |
|---|---|---|---|---|---|---|---|---|
| Mooney Viscosity[1] (MV) | 44-88 | 61.22 | 62.06 | 68.71 | 42.63 | 40.17 | 41.48 | 34.63 |
| Mooney Scorch[2] (minutes) | 5-30 | 8.39 | 7.66 | 8.15 | 8.99 | 10.51 | 11.5 | 12.49 |
| TC90 (minutes)[3] | 64.73 | 39.26 | 36.25 | 35.21 | 38.1 | 34.27 | 35.03 | 37.23 |

[1] MU at 212° F.
[2] MS + 1 at 290° F. (as determined by ASTM D 1646)
[3] TC90 is the 90 percent cure time measured by ODR at 300° F. (as determined by ASTM D2084)

As shown in Table 2, the insulation compositions had similar or improved rheological properties compared to the properties of the ASNBR composition.

Example 3

Physical, Mechanical, and Electrostatic Properties of the Insulation Compositions Physical, mechanical, and electrostatic properties of the insulation compositions described in Example 1 are shown in Table 3. These properties were determined by conventional techniques. The values for the mechanical properties of RDL7069 were measured at 2"/minute, while those for RDL6098, RDL6099, RDL7000, RDL7023, RDL7083, and RDL7094, and ASNBR were measured at 20"/minute. For comparative purposes, the physical, mechanical, and electrostatic properties of the ASNBR composition are also shown.

filled formulations. The other properties of the insulation compositions were similar to those of the ASNBR composition.

Example 4

Ablative Performance of the Insulation Compositions

The ablative performance of the insulation compositions described in Example 1 was determined in a high mach seventy pound char motor. Each of the insulation compositions was formed into a thin sheet and tested in the char motor. As known in the art, the char motor simulated typical temperature and pressure conditions in a low velocity, mid velocity, or high velocity section of a conventional rocket motor. The thickness of each of the insulation compositions was measured at selected intervals, nominally one inch apart, before

TABLE 3

Physical, Mechanical, and Electrostatic Properties of ASNBR, RDL6098, RDL6099, RDL7000, RDL7023, RDL7069, RDL7083, and RDL7094.

| Property | ASNBR | RDL6098 | RDL6099 | RDL7000 | RDL7023 | RDL7069 | RDL7083 | RDL7094 |
|---|---|---|---|---|---|---|---|---|
| Density (g/cm$^3$)[1] | 1.255-1.305 | 1.2014 | 1.1809 | 1.1787 | 1.1943 | 1.1833 | 1.19 | 1.19 |
| Shore A Hardness[2] | 75-85 | 76.4 | 79.4 | 81.5 | 69.6 | 71.2 | 71.9 | 71.4 |
| Tensile Elongation (parallel to fibers) (%)[3] | 50+ | 488 | 153 | 107 | 485 | 576 | 482 | 468 |
| Tensile Elongation (perpendic. to fibers) (%)[3] | 225+ | 517 | 368 | 420 | 498 | 568 | 461 | 529 |
| Tensile Strength (parallel to fibers) (%)[3] | 1000+ | 1230 | 1110 | 1210 | 969 | 914 | 947 | 713 |
| Tensile Strength (perpendic. to fibers) (%)[3] | 700+ | 1010 | 831 | 811 | 777 | 746 | 696 | 674 |
| Surface Resistivity (ohms/sq) | $6.1 \times 10^{12}$ | $7.04 \times 10^{11}$ | $7.48 \times 10^{11}$ | $11.12 \times 10^{11}$ | $5.67 \times 10^{11}$ | $7.68 \times 10^{11}$ | $1.48 \times 10^{12}$ | $9.86 \times 10^{11}$ |
| Volume Resistivity (ohm-cm) | $6.6 \times 10^{12}$ | $3.31 \times 10^{11}$ | $4.20 \times 10^{11}$ | $4.22 \times 10^{11}$ | $9.18 \times 10^{10}$ | $1.72 \times 10^{11}$ | $3.90 \times 10^{11}$ | $3.46 \times 10^{11}$ |
| Dielectric constant | 8.75 | 7.08 | 6.71 | 6.05 | 7.45 | 7.19 | 6.35 | 6.75 |
| Relaxation time (sec) | 5.10 | 0.21 | 0.25 | 0.22 | 0.06 | 0.11 | 0.22 | 0.20 |

[1] As determined by ASTM D792
[2] As determined by ASTM D2240
[3] As determined by ASTM D412

The insulation compositions of the present invention had physical, mechanical, and electrostatic properties similar to the desirable properties of the ASNBR composition. The insulation compositions had a slightly lower density than that of the ASNBR composition. Tensile properties of the insulation compositions were exceptional and greatly improved over that of the ASNBR composition or other synthetic fiber firing the char motor. The weight of each of the insulation compositions was also measured before firing. The insulation compositions were then assembled into the low velocity section, the middle velocity section, and the high velocity section of the char motor. After firing, the char motor was disassembled, and the thickness and weight of each insulation composition was measured again. The rate at which the insulation composition is reduced or erodes is expressed in terms of the reduction of the thickness of the insulation composition per second and is referred to as the material affected rate or material ablation rate ("MAR"). The MAR of the insulation composition was determined by subtracting the post-fired thickness of virgin insulation (i.e., after the char had been removed) at a given point from the pre-fired thickness at the same point and dividing the result by the burn time of the motor. The average weight loss of the insulation composition was determined as a function of the pre-fired weight. The MAR and average weight loss are indicators of damage to the insulation composition (ablation), where lower numbers indicate better insulative and ablative performance. The ablative performance of the insulation compositions is shown in Table 4.

TABLE 4

Ablative Performance for ASNBR, RDL6098, RDL6099, RDL7000, RDL7023, RDL7069, RDL7083, and RDL7094.

| Property | ASNBR | RDL6098 | RDL6099 | RDL7000 | RDL7023 | RDL7069 | RDL7083 | RDL7094 |
|---|---|---|---|---|---|---|---|---|
| Motor # | 1239 | 1251 | 1229 | 1229 | 1239 | 1251 | 1270 | 1270 |
| Low velocity region: Average MAR (mils/sec) | 3.21 | 3.49 | 3.84 | 3.85 | 4.13 | 3.96 | 3.98 | 3.57 |
| Low velocity region: Average Weight Loss (%) | 9.66 | 10.87 | 10.90 | 10.86 | 11.57 | 11.59 | 10.56 | 10.56 |
| Mid velocity region: Average MAR (mils/sec) | 9.62 | 8.86 | 10.18 | 8.92 | 9.29 | 8.07 | 9.5 | 9.27 |
| Mid velocity region: Average Weight Loss (%) | 11.26 | 10.87 | 11.76 | 10.97 | 11.80 | 11.97 | 10.84 | 10.32 |
| High velocity region: Average MAR (mils/sec) | 15.02 | 13.45 | 11.55 | 14.89 | 14.31 | 12.98 | 13.19 | 14.39 |
| High velocity region: Average Weight Loss (%) | 15.78 | 15.60 | 16.92 | 17.78 | 15.92 | 15.79 | 14.8 | 14.442 |

The results in Table 4 show that insulative compositions according to the present invention have ablative properties that are similar to those of the ASNBR composition.

In summary, the insulation compositions of the present invention had similar or better Theological properties and similar physical, electrostatic, and ablative properties compared to the ASNBR composition. Further the insulation compositions of the present invention had improved mechanical properties when compared to the ASNBR composition. As such, the insulation compositions are suitable drop-in replacements for the ASNBR composition.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An insulation composition comprising:
   a polymer comprising at least one of a nitrile butadiene rubber and polybenzimidazole fibers;
   basalt fibers having a diameter that is at least 5 µm; and
   at least one nanoclay.

2. The insulation composition of claim 1, wherein the polymer comprises a nitrile butadiene rubber.

3. The insulation composition of claim 2, wherein the nitrile butadiene rubber comprises a copolymer of acrylonitrile and butadiene.

4. The insulation composition of claim 2, wherein the nitrile butadiene rubber comprises from approximately 35% by weight to approximately 56% by weight of a total weight of the insulation composition.

5. The insulation composition of claim 1, wherein the basalt fibers comprise from approximately 1% by weight to approximately 6% by weight of a total weight of the insulation composition.

6. The insulation composition of claim 1, wherein the basalt fibers have a diameter that ranges from approximately 5 µm to approximately 25 µm.

7. The insulation composition of claim 1, wherein the at least one nanoclay comprises from approximately 5% by weight to approximately 10% by weight of a total weight of the insulation composition.

8. The insulation composition of claim 1, further comprising at least one reinforcing agent, at least one tackifier, at least one antioxidant, at least one flame retardant, at least one filler, at least one plasticizer, at least one processing aid, at least one retarder, carbon black, at least one pigment, at least one bonding agent, at least one cure agent, at least one cure accelerator, at least one cure activator, or combinations thereof.

9. The insulation composition of claim 1, further comprising cellulose fibers, sisal fibers, mineral wool fibers, nylon fibers, polyester fibers, polyimide fibers, polybenzimidazole fibers, polyaramid fibers, or combinations thereof.

10. The insulation composition of claim 1, wherein the polymer comprises the polybenzimidazole fibers.

11. The insulation composition of claim 10, wherein the polybenzimidazole fibers comprise from approximately 2% by weight to approximately 8% by weight of a total weight of the insulation composition.

12. The insulation composition of claim 10, wherein the polybenzimidazole fibers have a length that ranges from approximately 1/16 of an inch to approximately 1 inch.

13. The insulation composition of claim 10, wherein the polybenzimidazole fibers have a length of approximately 1/4 of an inch.

14. The insulation composition of claim 1, further comprising at least one matrix agent.

15. The insulation composition of claim 14, wherein the at least one matrix agent is selected from the group consisting of ethylene propylene-diene monomer rubbers, natural rubbers, butadiene-styrene copolymer rubbers, nitrile rubbers, polybutadiene rubbers, and polyisoprene rubbers.

16. The insulation composition of claim 1, wherein the polymer comprises the polybenzimidazole fibers and the nitrile butadiene rubber.

17. The insulation composition of claim 16, wherein the nitrile butadiene rubber comprises from approximately 35% by weight to approximately 56% by weight of a total weight of the insulation composition.

18. The insulation composition of claim 16, wherein the basalt fibers comprise from approximately 1% by weight to approximately 6% by weight of a total weight of the insulation composition.

19. The insulation composition of claim 16, wherein the basalt fibers have a diameter that ranges from approximately 5 μm to approximately 25 μm.

20. The insulation composition of claim 16, wherein the at least one nanoclay comprises from approximately 5% by weight to approximately 10% by weight of a total weight of the insulation composition.

21. The insulation composition of claim 16, further comprising at least one reinforcing agent, at least one tackifier, at least one antioxidant, at least one flame retardant, at least one filler, at least one plasticizer, at least one processing aid, at least one retarder, carbon black, at least one pigment, at least one bonding agent, at least one cure agent, at least one cure accelerator, at least one cure activator, or combinations thereof.

22. The insulation composition of claim 16, further comprising cellulose fibers, sisal fibers, mineral wool fibers, nylon fibers, polyester fibers, polyimide fibers, polyaramid fibers, or combinations thereof.

23. The insulation composition of claim 16, wherein the polybenzimidazole fibers comprise from approximately 2% by weight to approximately 8% by weight of a total weight of the insulation composition.

24. The insulation composition of claim 16, wherein the polybenzimidazole fibers have a length that ranges from approximately 1/16 of an inch to approximately 1 inch.

25. The insulation composition of claim 10, wherein the polybenzimidazole fibers have a length of approximately 1/4 of an inch.

26. The insulation composition of claim 16, further comprising at least one matrix agent.

27. The insulation composition of claim 26, wherein the at least one matrix agent is selected from the group consisting of ethylene propylene-diene monomer rubbers, natural rubbers, butadiene-styrene copolymer rubbers, nitrile rubbers, polybutadiene rubbers, and polyisoprene rubbers.

* * * * *